US010992672B2

(12) United States Patent
Zakaria

(10) Patent No.: US 10,992,672 B2
(45) Date of Patent: *Apr. 27, 2021

(54) SYSTEM AND METHOD FOR AUTOMATIC WIRELESS NETWORK AUTHENTICATION

(71) Applicant: Afero, Inc., Los Altos, CA (US)

(72) Inventor: Omar Zakaria, Santa Clara, CA (US)

(73) Assignee: Afero, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,732

(22) Filed: Dec. 30, 2019

(65) Prior Publication Data

US 2020/0213307 A1  Jul. 2, 2020

Related U.S. Application Data

(63) Continuation of application No. 15/828,665, filed on Dec. 1, 2017, now Pat. No. 10,523,672, which is a
(Continued)

(51) Int. Cl.
*H04L 29/06* (2006.01)
*H04W 4/70* (2018.01)
(Continued)

(52) U.S. Cl.
CPC ...... *H04L 63/0876* (2013.01); *H04L 41/0886* (2013.01); *H04L 63/0884* (2013.01);
(Continued)

(58) Field of Classification Search
CPC ............ H04L 63/0876; H04L 63/0884; H04L 41/0886; H04W 12/003; H04W 12/0608;
(Continued)

(56) References Cited

U.S. PATENT DOCUMENTS

| 8,571,222 | B1 * | 10/2013 | Perry | ............... H04W 12/06 380/270 |
| 2005/0063333 | A1 * | 3/2005 | Patron | ............... H04W 12/0608 370/329 |

(Continued)

FOREIGN PATENT DOCUMENTS

| CN | 101547383 A | 9/2009 |
| CN | 101827066 A | 9/2010 |

(Continued)

OTHER PUBLICATIONS

Doherty et al., "Dynamic Symmetric Key Provisioning Protocol (DSKPP)", Internet Engineering Task Force (IETF), Request for Comments: 6063, Dec. 2010, 105 pages.

(Continued)

*Primary Examiner* — J. Brant Murphy
(74) *Attorney, Agent, or Firm* — Nicholson De Vos Webster & Elliott LLP

(57) ABSTRACT

A system and method are described for connecting an IoT device to a wireless router and/or access point. For example, one embodiment of a system comprises: an Internet of things (IoT) hub to collect network credentials required to connect with a wireless access point or router; the IoT hub to securely store the network credentials in a local or remote credentials database along with identification data identifying a user account and/or the wireless access point or router; a new IoT device to establish a connection with the IoT hub, another IoT device, and/or a user data processing device; the new IoT device to transmit a request for network credentials to establish a connection with the wireless access point or router; the IoT hub, IoT device and/or user data processing device to provide connectivity to the credentials database on behalf of the new IoT device, to receive the network credentials from the credentials database and to provide the network credentials to the new IoT device; and the new IoT
(Continued)

device to automatically use the network credentials to establish a connection with the wireless access point or router.

28 Claims, 18 Drawing Sheets

Related U.S. Application Data continuation of application No. 14/675,715, filed on Mar. 31, 2015, now Pat. No. 9,838,390.

(51) Int. Cl.
| | |
|---|---|
| H04W 4/24 | (2018.01) |
| H04W 12/50 | (2021.01) |
| H04W 12/06 | (2021.01) |
| H04L 12/24 | (2006.01) |
| H04W 4/80 | (2018.01) |
| H04W 84/12 | (2009.01) |

(52) U.S. Cl.
CPC .............. *H04W 4/24* (2013.01); *H04W 4/70* (2018.02); *H04W 12/06* (2013.01); *H04W 12/068* (2021.01); *H04W 12/50* (2021.01); *H04W 4/80* (2018.02); *H04W 84/12* (2013.01)

(58) Field of Classification Search
CPC ......... H04W 4/70; H04W 4/24; H04W 12/06; H04W 4/80; H04W 84/12
See application file for complete search history.

(56) References Cited

U.S. PATENT DOCUMENTS

| | | | | |
|---|---|---|---|---|
| 2007/0140255 | A1* | 6/2007 | Gautier | H04W 88/06 370/395.5 |
| 2010/0151818 | A1* | 6/2010 | Miller | H04L 63/0815 455/406 |
| 2012/0254960 | A1* | 10/2012 | Lortz | H04L 63/104 726/7 |
| 2013/0094444 | A1* | 4/2013 | Lai | H04W 4/70 370/328 |
| 2013/0333016 | A1* | 12/2013 | Coughlin | H04L 63/083 726/9 |
| 2014/0250204 | A1* | 9/2014 | Shalunov | H04L 67/104 709/217 |
| 2014/0254799 | A1* | 9/2014 | Husted | H04W 12/003 380/270 |
| 2014/0331144 | A1* | 11/2014 | Kim | H04L 67/025 715/739 |
| 2015/0095933 | A1* | 4/2015 | Blackburn | H04N 7/141 725/25 |
| 2016/0006837 | A1* | 1/2016 | Reynolds | H04L 69/14 709/203 |
| 2016/0072806 | A1* | 3/2016 | Kim | H04L 67/16 726/5 |
| 2016/0100035 | A1 | 4/2016 | Martis | |
| 2016/0173495 | A1* | 6/2016 | Joo | H04L 63/102 713/171 |
| 2016/0197934 | A1 | 7/2016 | Muraoka et al. | |
| 2016/0226707 | A1* | 8/2016 | Schallich | H04L 12/2898 |
| 2016/0227371 | A1* | 8/2016 | Wang | H04W 4/023 |
| 2016/0234628 | A1* | 8/2016 | Rahman | H04L 12/2809 |

FOREIGN PATENT DOCUMENTS

| | | |
|---|---|---|
| CN | 103828413 A | 5/2014 |
| WO | 2014/117539 A1 | 8/2014 |
| WO | 2014/210330 A1 | 12/2014 |
| WO | 2015/031779 A1 | 3/2015 |
| WO | 2015/042370 A1 | 3/2015 |
| WO | 2016/003311 A1 | 1/2016 |

OTHER PUBLICATIONS

Examiner initiated interview summary received for U.S. Appl. No. 15/828,665, dated Oct. 2, 2019, 2 pages.
Final Office Action from U.S. Appl. No. 14/675,715, dated Jan. 26, 2017, 15 pages.
International Preliminary Report on Patentability for Application No. PCT/US2016/025083, dated Oct. 12, 2017, 10 pages.
International Search Report and Written Opinion for Application No. PCT/US2016/025083, dated Jul. 22, 2016, 12 pages.
Non-Final Office Action from U.S. Appl. No. 14/675,715, dated Jul. 5, 2017, 8 pages.
Non-Final Office Action from U.S. Appl. No. 14/675,715, dated Sep. 30, 2016, 17 pages.
Notice of Allowance from U.S. Appl. No. 14/675,715, dated Aug. 31, 2017, 11 pages.
Notice of Allowance received for U.S. Appl. No. 15/828,665, dated Oct. 2, 2019, 13 pages.
Notice of Reasons for Refusal, JP App. No. 2017-551230, dated Feb. 25, 2020, 7 pages (4 pages of English Translation and 3 pages of Office Action).
First Office Action, CN App. No. 201680020452.3, dated Jul. 31, 2020, 14 pages (7 pages of English Translation and 7 pages of Original Document).
Notice of Reasons for Rejection, JP App. No. 2017-551230, dated Jan. 21, 2021, 4 pages (2 pages of English Translation and 2 pages of Original Document).
Notification to Grant Patent Right for Invention, CN App. No. 2016800204523, dated Jan. 18, 2021, 4 pages (2 pages of English Translation and 2 pages of Original Document).

* cited by examiner

SYSTEM AND METHOD FOR AUTOMATIC WIRELESS NETWORK AUTHENTICATION

BACKGROUND

Field of the Invention

This invention relates generally to the field of computer systems. More particularly, the invention relates to a system and method for automatic wireless network authentication.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

When user get new WiFi-enabled device, such as an IoT device that supports WiFi, a process of registration between the new device and the user home network needs to be executed. This process can be painful if the user does not remember the WiFi credentials or if the device is out of the WiFi coverage area. Furthermore, if the device is within the coverage edge of the WiFi network the registration will fail because the low coverage condition will corrupt the process of registration which will result in the access point rejecting the registration of the new device. The problem is more complicated for users who have multiple WiFi networks inside their home or business. In these circumstances, each network will require its own registration process.

Finally, a user cannot establish the registration of the new device without being inside the home or business that hosts the private network. Consequently, original equipment manufacturers (OEMs) are unable to send a device to a user that is ready to connect to their WiFi networks out of the box.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
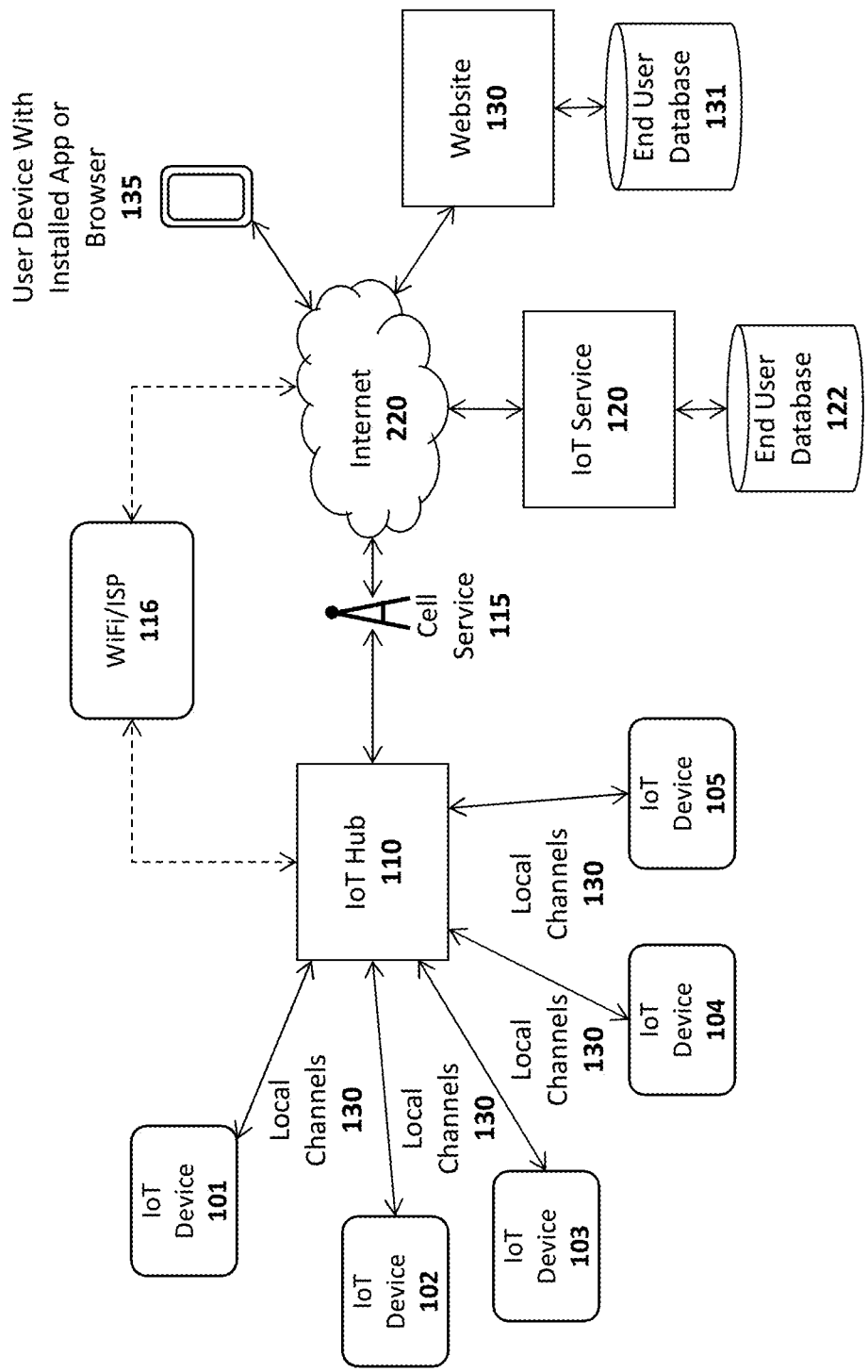
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc.), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
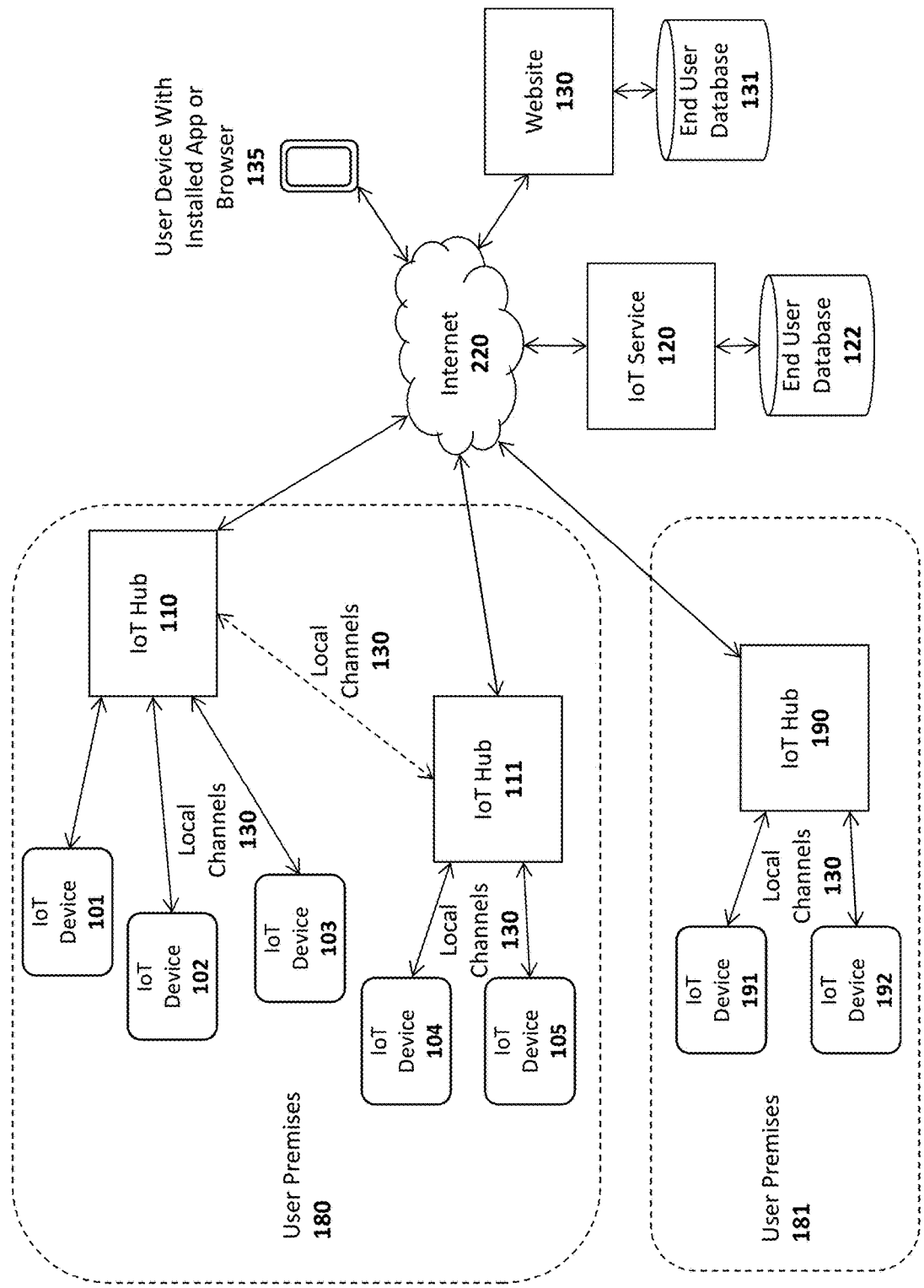

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc.). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
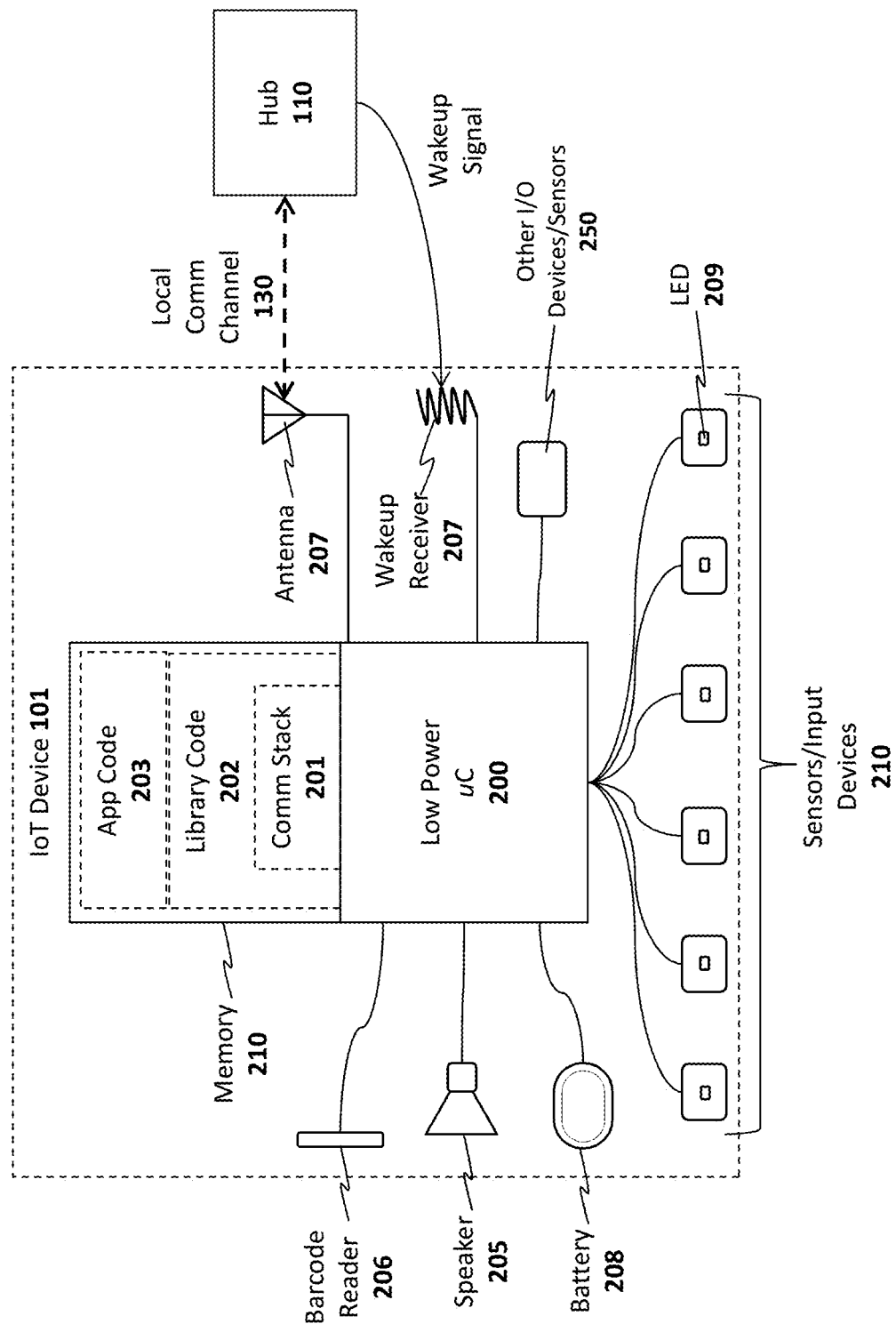
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
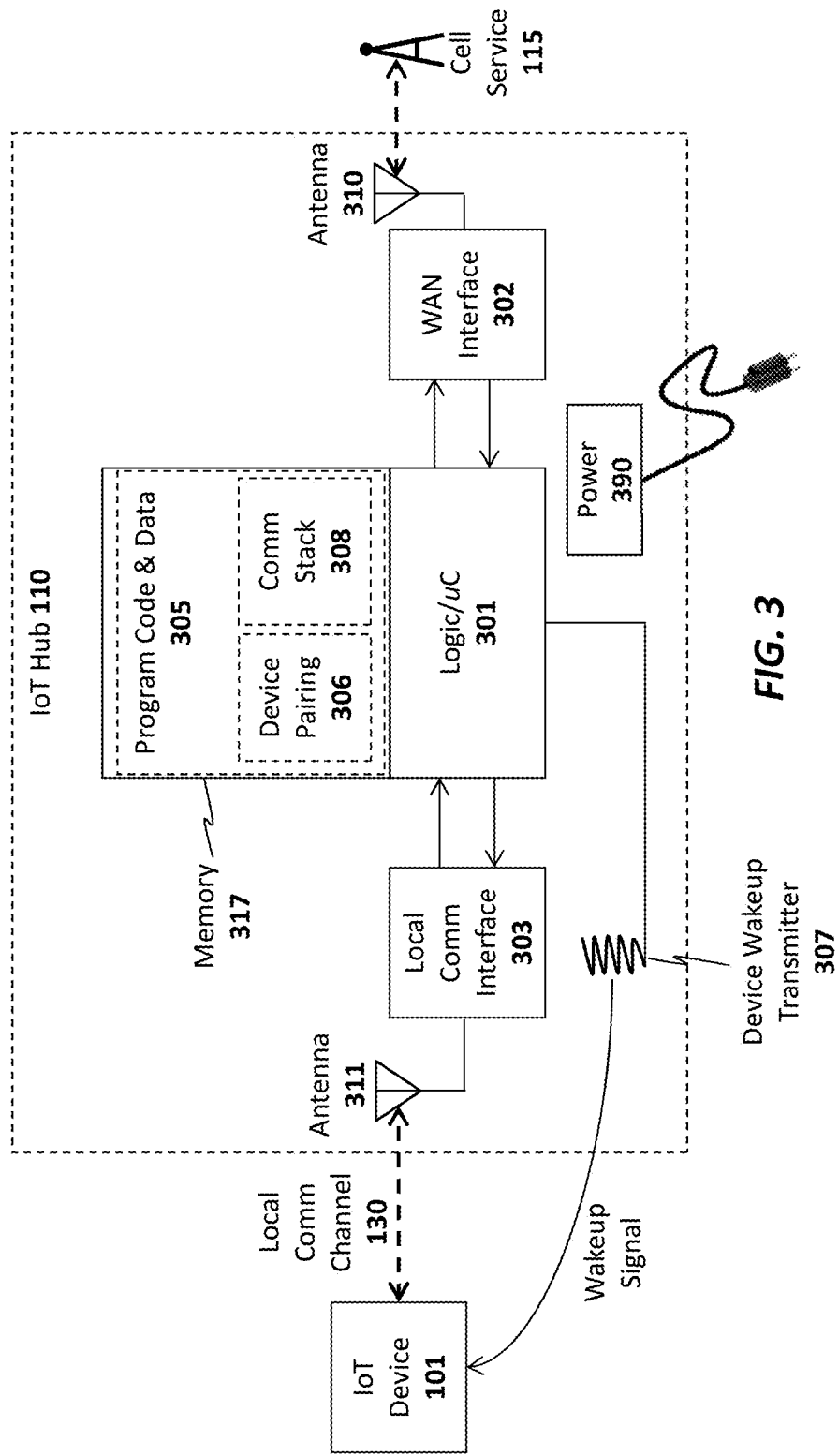
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
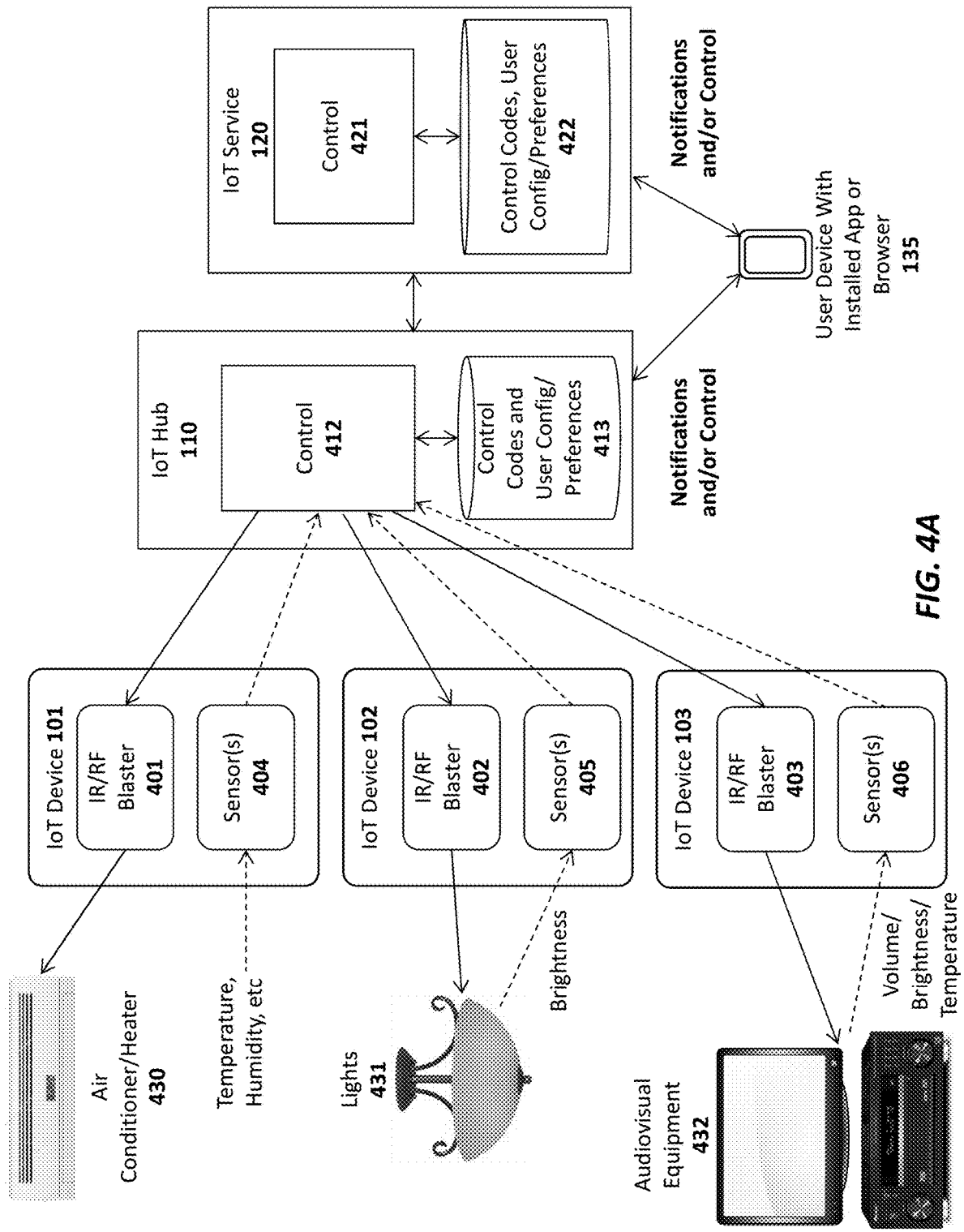
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc.). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
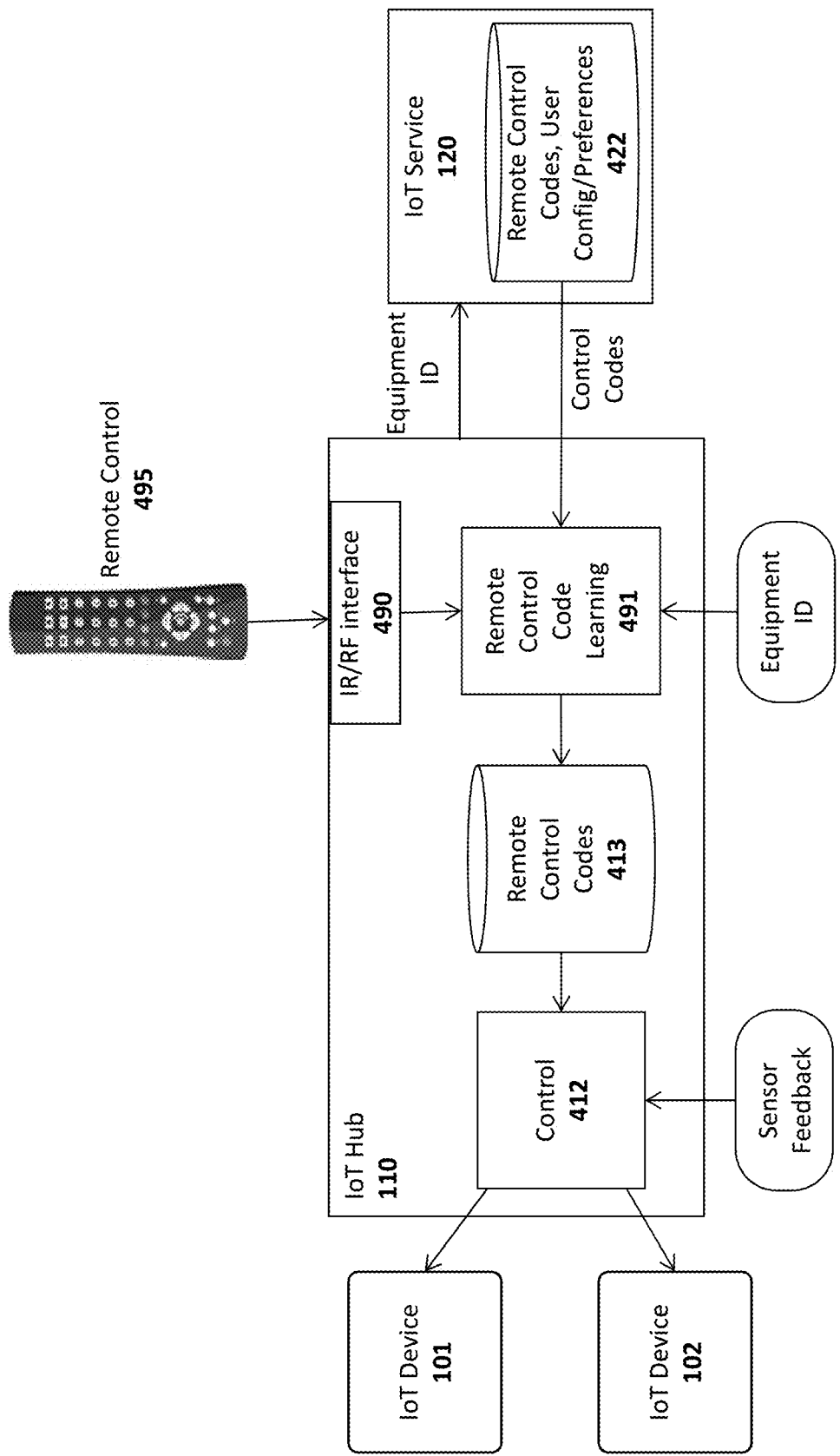

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc.). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
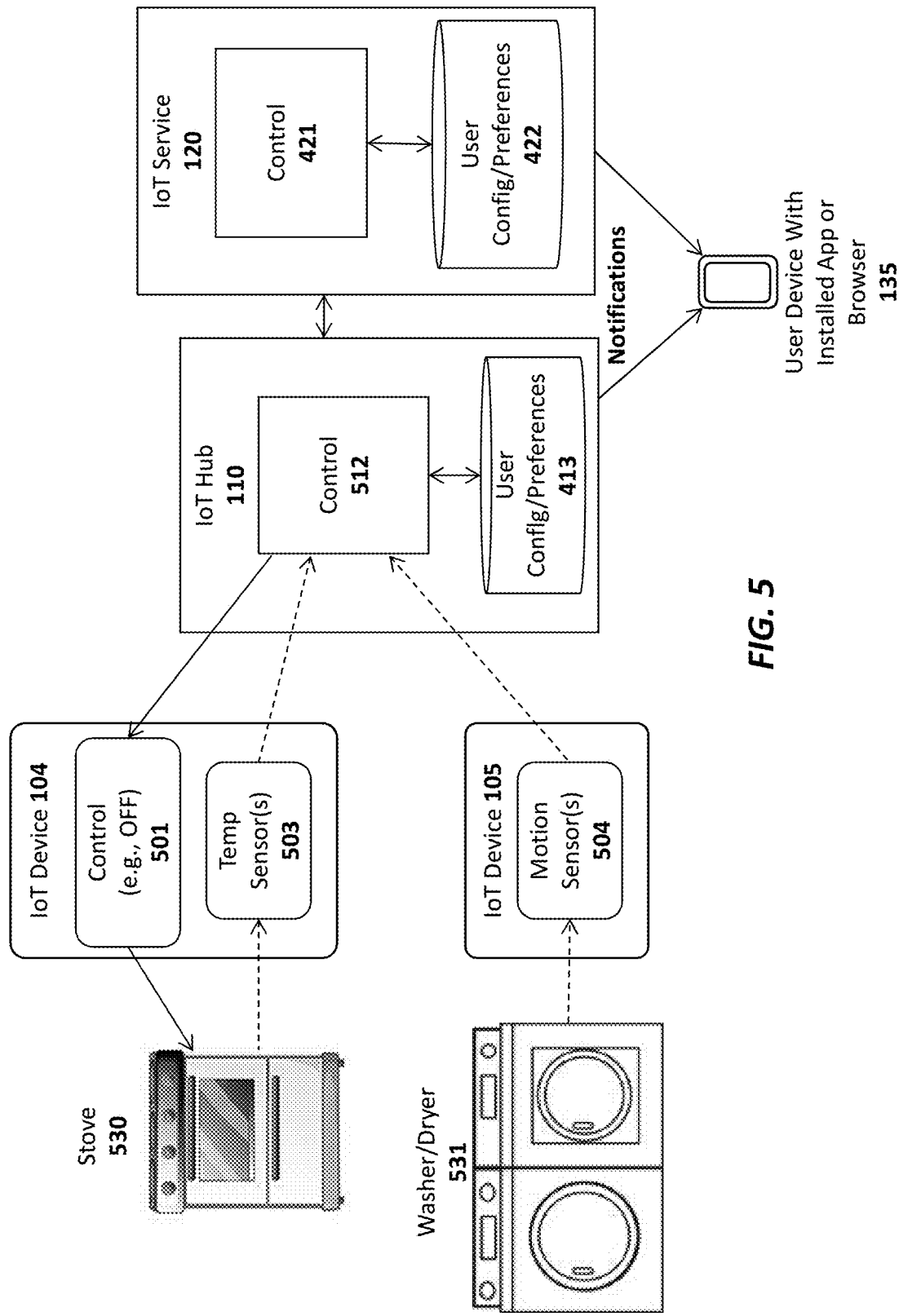
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 6-11 and associated text). Alternatively, the keys may be secured in a subscriber identify module (SIM) as discussed below.

Figure 6:
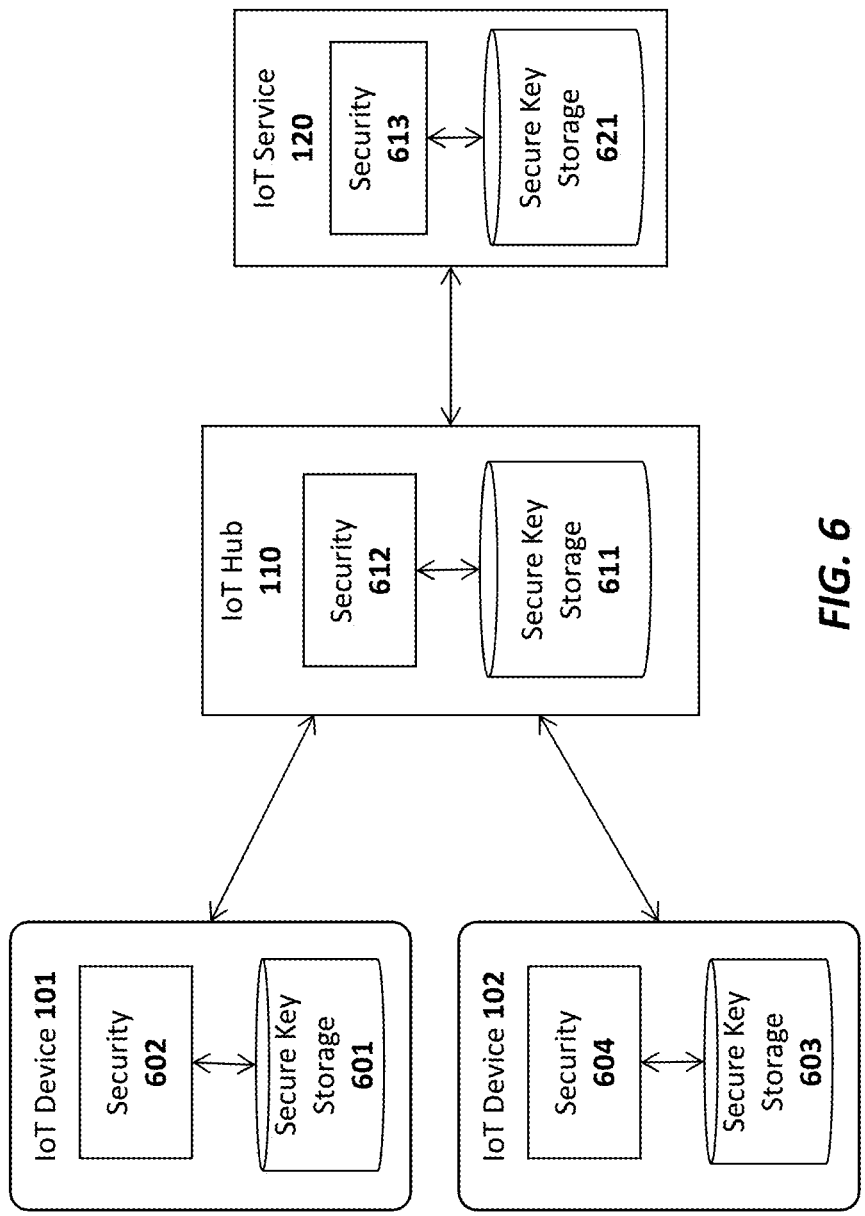
FIG. 6 illustrates embodiments of the invention which implements improved security techniques such as encryption and digital signatures.

FIG. 6 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 601, 603, respectively, for security storing each device's private key. Security logic 602, 1304 then utilizes the securely stored private keys to perform the encryption/decryption operations described herein. Similarly, the IoT hub 110 includes a secure storage 611 for storing the IoT hub private key and the public keys of the IoT devices 101-102 and the IoT service 120; as well as security logic 612 for using the keys to perform encryption/decryption operations. Finally, the IoT service 120 may include a secure storage 621 for security storing its own private key, the public keys of various IoT devices and IoT hubs, and a security logic 613 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 611.

By way of example, in one embodiment, when the IoT service 120 needs to transmit a command or data to an IoT device 101 (e.g., a command to unlock a door, a request to read a sensor, data to be processed/displayed by the IoT device, etc.) the security logic 613 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 612 in the IoT hub is trusted, the service 120 could negotiate a session key with the hub security module 1312 and then the security module 612 would negotiate a session key with each device 120. Messages from the service 120 would then be decrypted and verified in the hub security module 612 before being re-encrypted for transmission to the device 101.

In one embodiment, to prevent a compromise on the hub security module 612 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 602 on the IoT device 101 uses the public key of the IoT hub 110 to encrypt data packets sent to the IoT hub 110. The security logic 612 on the IoT hub 110 may then decrypt the data packets using the IoT hub's private key. Similarly, the security logic 602 on the IoT device 101 and/or the security logic 612 on the IoT hub 110 may encrypt data packets sent to the IoT service 120 using the public key of the IoT service 120 (which may then be decrypted by the security logic 613 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 7:
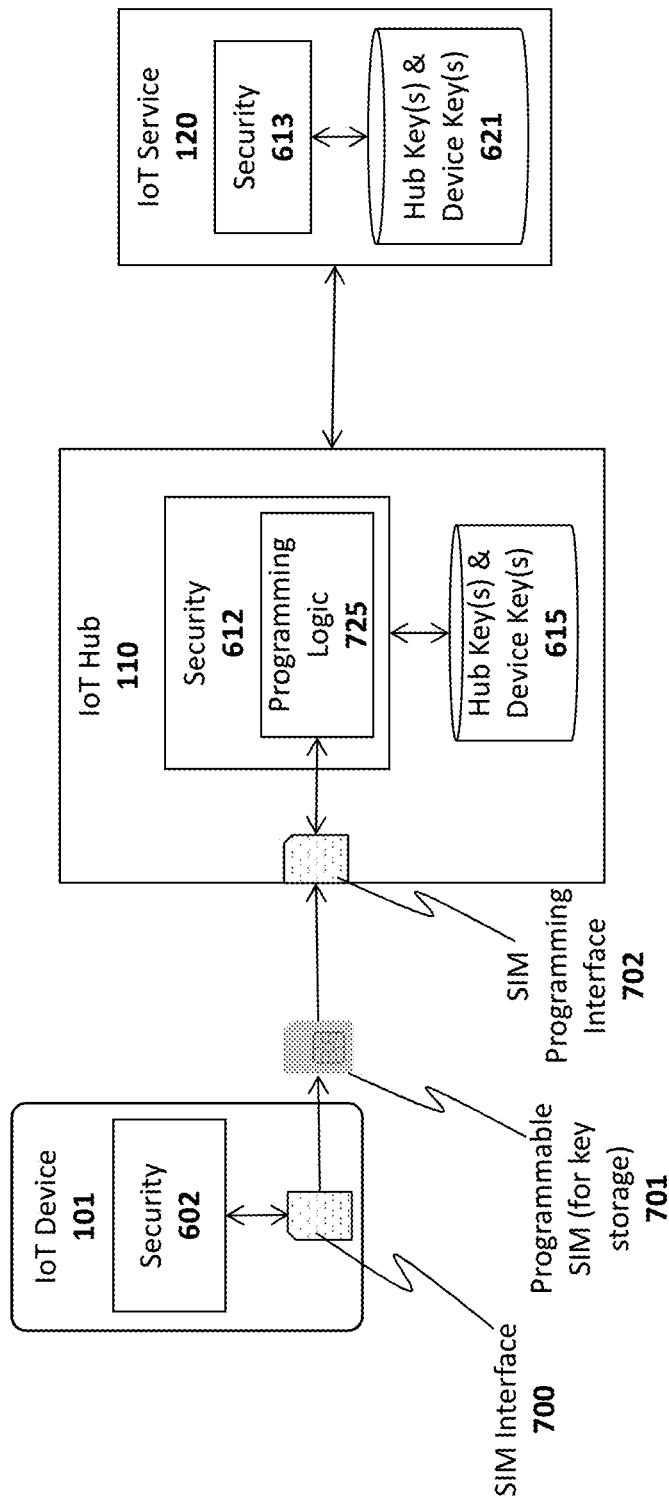
FIG. 7 illustrates one embodiment of an architecture in which a subscriber identity module (SIM) is used to store keys on IoT devices.

As illustrated in FIG. 7, in one embodiment, the secure key storage on each IoT device 101 is implemented using a programmable subscriber identity module (SIM) 701. In this embodiment, the IoT device 101 may initially be provided to the end user with an un-programmed SIM card 701 seated within a SIM interface 700 on the IoT device 101. In order to program the SIM with a set of one or more encryption keys, the user takes the programmable SIM card 701 out of the SIM interface 500 and inserts it into a SIM programming interface 702 on the IoT hub 110. Programming logic 725 on the IoT hub then securely programs the SIM card 701 to register/pair the IoT device 101 with the IoT hub 110 and IoT service 120. In one embodiment, a public/private key pair may be randomly generated by the programming logic 725 and the public key of the pair may then be stored in the IoT hub's secure storage device 411 while the private key may be stored within the programmable SIM 701. In addition, the programming logic 525 may store the public keys of the IoT hub 110, the IoT service 120, and/or any other IoT devices 101 on the SIM card 601 (to be used by the security logic 1302 on the IoT device 101 to encrypt outgoing data). Once the SIM 701 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 7 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 702 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 8A:
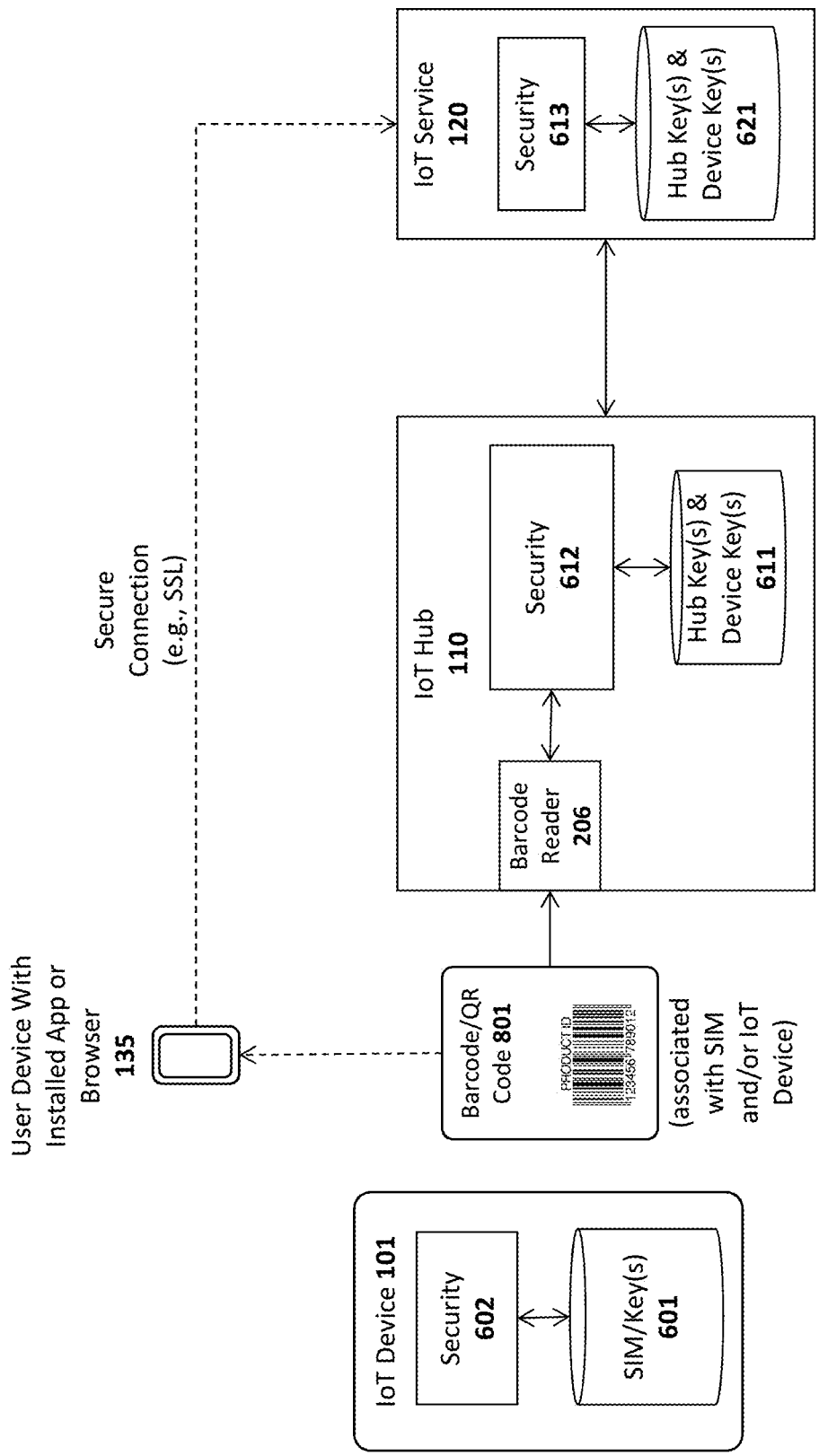
FIG. 8A illustrates one embodiment in which IoT devices are registered using barcodes or QR codes.

For example, as illustrated in FIG. 8A each IoT device 101 or SIM 401 may be packaged with a barcode or QR code 701 uniquely identifying the IoT device 101 and/or SIM 701. In one embodiment, the barcode or QR code 801 comprises an encoded representation of the public key for the IoT device 101 or SIM 1001. Alternatively, the barcode or QR code 801 may be used by the IoT hub 110 and/or IoT service 120 to identify or generate the public key (e.g., used as a pointer to the public key which is already stored in secure storage). The barcode or QR code 601 may be printed on a separate card (as shown in FIG. 8A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 801 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 701 may be used to pair each IoT device 101 with the IoT hub 110. For example, rather than using the standard wireless pairing process currently used to pair Bluetooth LE devices, a pairing code embedded within the barcode or QR code 701 may be provided to the IoT hub 110 to pair the IoT hub with the corresponding IoT device.

Figure 8B:
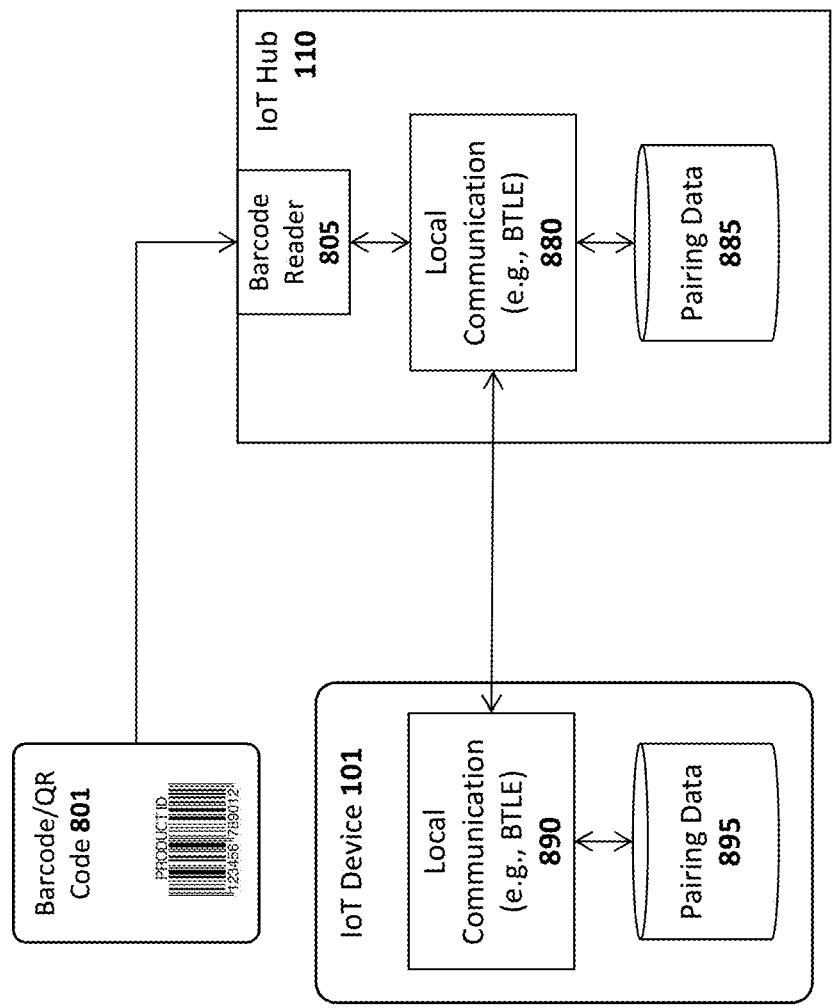
FIG. 8B illustrates one embodiment in which pairing is performed using barcodes or QR codes.

FIG. 8B illustrates one embodiment in which the barcode reader 206 on the IoT hub 110 captures the barcode/QR code 801 associated with the IoT device 101. As mentioned, the barcode/QR code 801 may be printed directly on the IoT device 101 or may be printed on a separate card provided with the IoT device 101. In either case, the barcode reader 206 reads the pairing code from the barcode/QR code 801 and provides the pairing code to the local communication module 880. In one embodiment, the local communication module 880 is a Bluetooth LE chip and associated software, although the underlying principles of the invention are not limited to any particular protocol standard. Once the pairing code is received, it is stored in a secure storage containing pairing data 885 and the IoT device 101 and IoT hub 110 are automatically paired. Each time the IoT hub is paired with a new IoT device in this manner, the pairing data for that pairing is stored within the secure storage 685. In one embodiment, once the local communication module 880 of the IoT hub 110 receives the pairing code, it may use the code as a key to encrypt communications over the local wireless channel with the IoT device 101.

Similarly, on the IoT device 101 side, the local communication module 890 stores pairing data within a local secure storage device 895 indicating the pairing with the IoT hub. The pairing data 895 may include the pre-programmed pairing code identified in the barcode/QR code 801. The pairing data 895 may also include pairing data received from the local communication module 880 on the IoT hub 110 required for establishing a secure local communication channel (e.g., an additional key to encrypt communication with the IoT hub 110).

Thus, the barcode/QR code 801 may be used to perform local pairing in a far more secure manner than current wireless pairing protocols because the pairing code is not transmitted over the air. In addition, in one embodiment, the same barcode/QR code 801 used for pairing may be used to identify encryption keys to build a secure connection from the IoT device 101 to the IoT hub 110 and from the IoT hub 110 to the IoT service 120.

Figure 9:
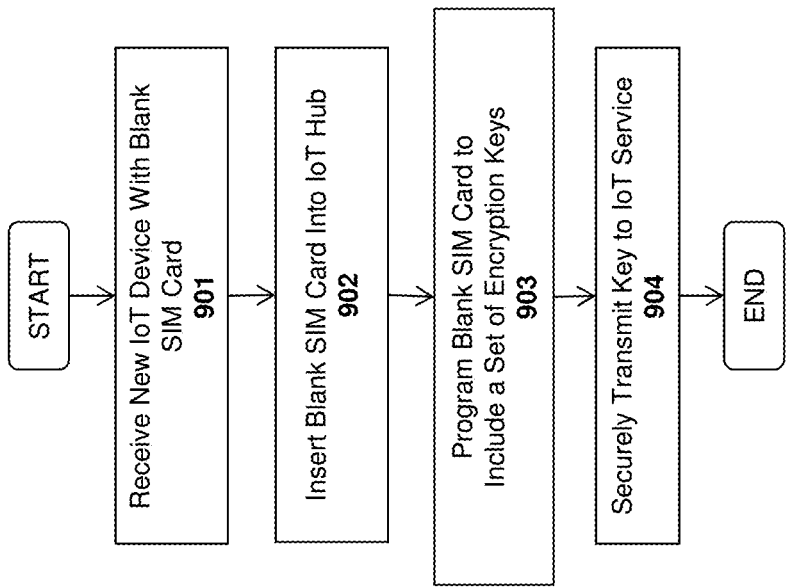
FIG. 9 illustrates one embodiment of a method for programming a SIM using an IoT hub.

A method for programming a SIM card in accordance with one embodiment of the invention is illustrated in FIG. 9. The method may be implemented within the system architecture described above, but is not limited to any particular system architecture.

At 901, a user receives a new IoT device with a blank SIM card and, at 802, the user inserts the blank SIM card into an IoT hub. At 903, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 904, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 9.

Figure 10:
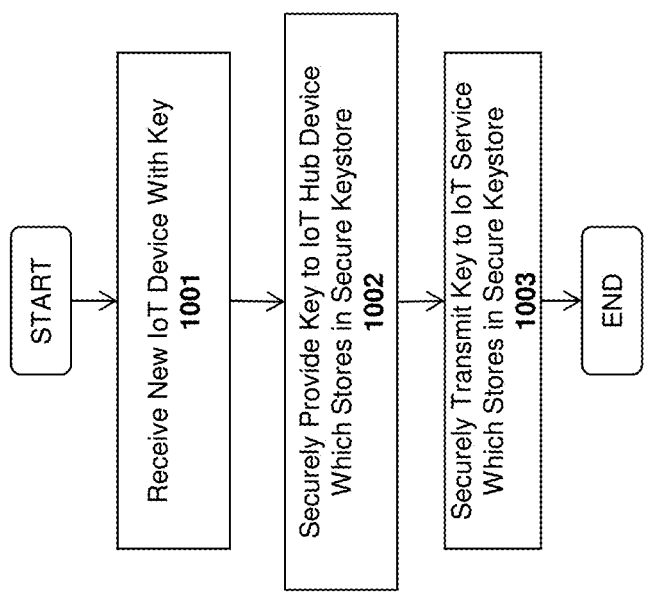
FIG. 10 illustrates one embodiment of a method for registering an IoT device with an IoT hub and IoT service.

A method for integrating a new IoT device into a network is illustrated in FIG. 10. The method may be implemented within the system architecture described above, but is not limited to any particular system architecture.

At 1001, a user receives a new IoT device to which an encryption key has been pre-assigned. At 1002, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 1003, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 11:
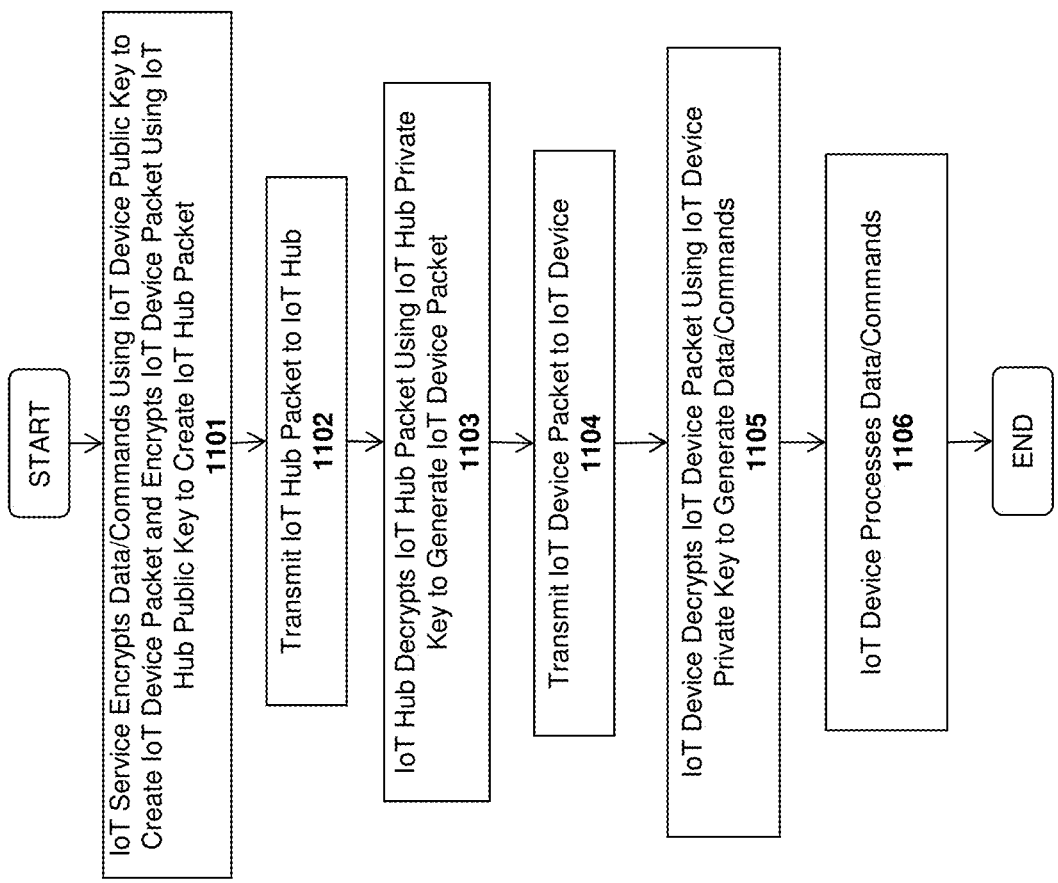
FIG. 11 illustrates one embodiment of a method for encrypting data to be transmitted to an IoT device.

A method for securely communicating commands/data to an IoT device using public/private keys is illustrated in FIG. 11. The method may be implemented within the system architecture described above, but is not limited to any particular system architecture.

At 1101, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1102, the IoT service transmits the IoT hub packet to the IoT hub. At 1103, the IoT hub decrypts the IoT hub packet using the IoT hub's private key to generate the IoT device packet. At 1104 it then transmits the IoT device packet to the IoT device which, at 1105, decrypts the IoT device packet using the IoT device private key to generate the data/commands. At 1106, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Embodiments for Automatic Wireless Network Authentication

In order to connect the IoT hub to a local wireless network such as a WiFi network, the user must provide network credentials such as a network security key or password. Other layers of authentication may also be required such as a user ID/password combination. In one embodiment, once the IoT hub successfully connects to the local wireless network using the network credentials provided by the user, it securely transmits the network credentials to a secure storage location such as the IoT service 120. When a user subsequently receives a new IoT device, the IoT device may be configured to transmit a request for network credentials to the IoT hub. in response, the IoT hub may forward the request to the IoT service 120 which may perform a lookup in a credentials database using, for example, the identity of the IoT device, the user, and/or the access point to which connection is needed to identify the relevant network credentials. If the network credentials can be identified, they are transmitted back to the IoT device, which then uses the network credentials to seamlessly connect to the local wireless network.

Figure 12:
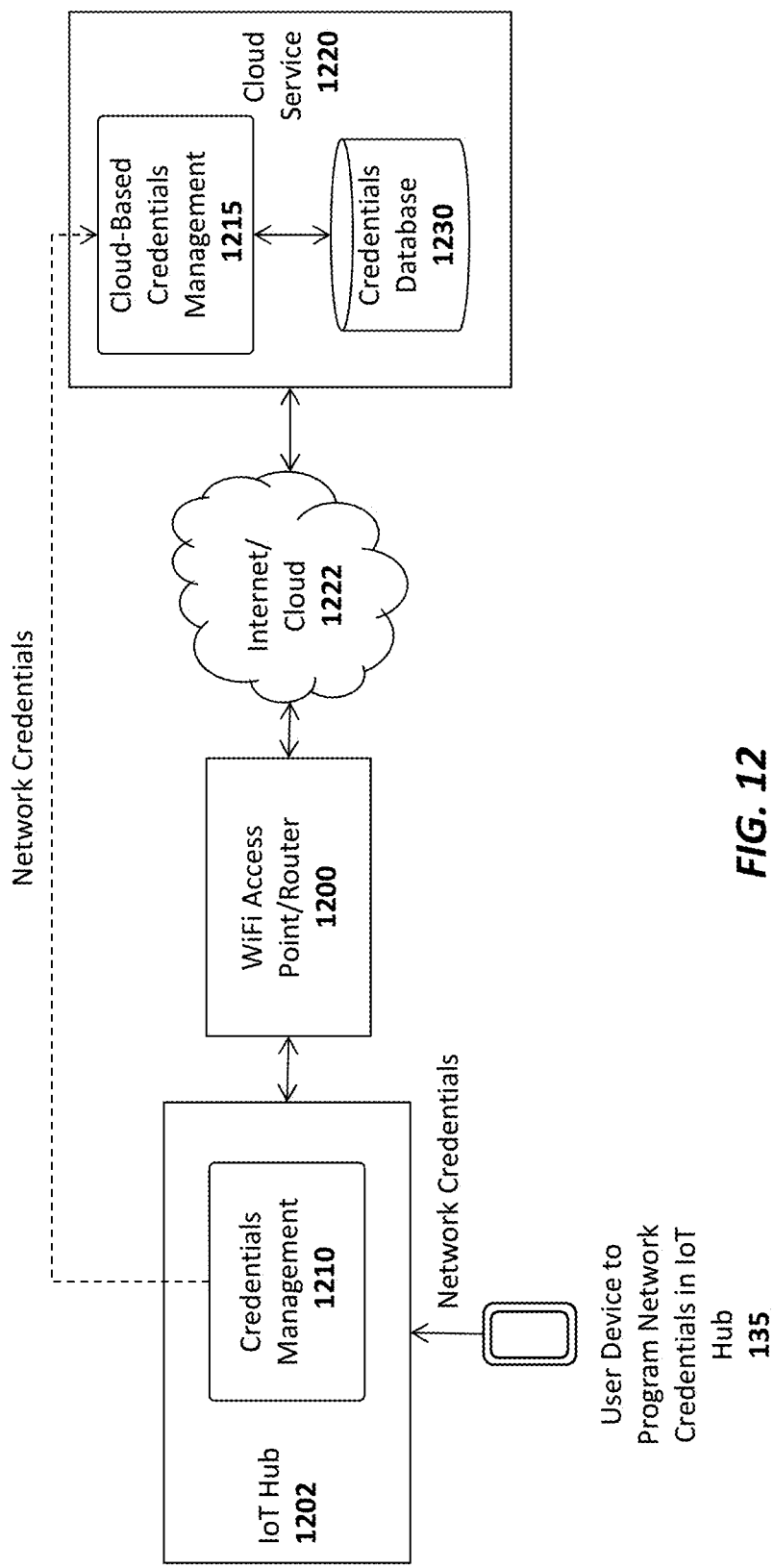
FIG. 12 illustrates one embodiment of an architecture for collecting and storing network credentials.

FIG. 12 illustrates an exemplary system architecture in which a credentials management module 1210 on the IoT hub 1202 implements the credential processing techniques described herein. As illustrated, the user may provide network credentials such as a network security key or password to the IoT hub 1202 via a user device 135 (which may be a mobile smartphone device, wearable data processing device, laptop computer, or desktop computer). The user device 135 initially connects to the IoT hub 1202 through a wired connection or a short range wireless connection such as BTLE and the user provides the credentials via an app or browser configured to connect with the IoT hub 1202.

In one embodiment, the network credentials comprise a security key such as a Wi-Fi Protected Access (WPA) or Wi-Fi Protected Access II (WPA2). In this embodiment, the network credentials may be in the form of a pre-shared key (PSK) for WPA-Personal implementations or may rely on more advanced authentication techniques such as those used by WPA-Enterprise (which may utilize a RADIUS authentication server and various forms of the Extensible Authentication Protocol (EAP)).

Regardless of the specific authentication/encryption techniques used, once the user has provided the necessary network credentials, the IoT hub 1202 uses the credentials to establish a secure wireless connection to the WiFi access point/router 1200 which then provides connectivity to a cloud service 1220 over the Internet 1222. In one embodiment, the credentials management module 1210 on the IoT hub 1210 establishes a connection with a credentials management module 1215 on the cloud service 1220 (e.g., which may be the IoT service 120 or an external web site 130 described above).

In one embodiment, one or more of the key-based s techniques described above may be employed to ensure that the connection between the credentials management module 1210 on the IoT hub 1202 and the credentials management module 1215 on the cloud service 1220 is secure (e.g., using a symmetric or asymmetric key to encrypt all network traffic). Once a secure connection has been established, the credentials management module 1210 on the IoT hub 1202 transmits a copy of the network credentials to the credentials management module 1215 on the cloud service, which stores a copy of the credentials in a secure credentials database 1230. The credentials database 1230 may include data uniquely identifying the IoT hub 1202, data uniquely identifying the user account associated with the IoT hub 1202, and/or data uniquely identifying the WiFi access point/router 1200 (to ensure that the network credentials are associated with the correct user and WiFi access point/router).

Figure 13:
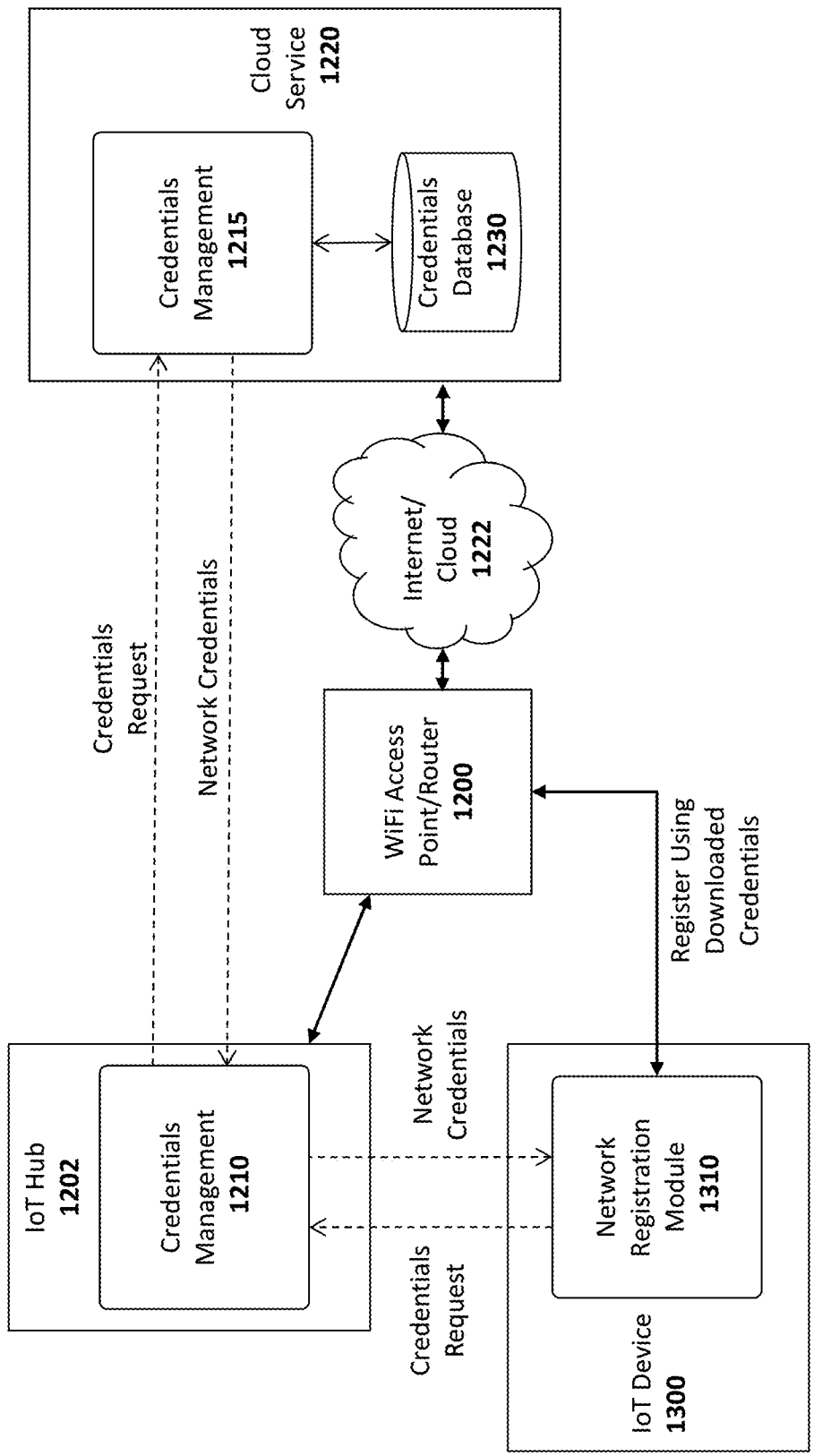
FIG. 13 illustrates one embodiment of an architecture for registering a user with a wireless access point.

As illustrated in FIG. 13, after the network credentials have been stored in the credentials database 1230, when the user purchases a new IoT device 1300, the IoT device will enable its local wireless interface (e.g., BTLE) and search for any enabled devices within coverage (e.g., the IoT Hub 1202, other IoT devices, or the user's mobile device). In the specific embodiment shown in FIG. 13, the IoT device 1300 has detected and connected to an IoT hub 1202. In one embodiment, once the connection is established, a network registration module 1310 transmits a network credentials request to the credentials management module 1210 on the IoT hub 1202. The credentials request may include data identifying the WiFI access point/router 1200 to which the IoT device 1300 would like to connect (e.g., the SSID, MAC address or other data uniquely identifying the WiFi access point/router 1200) as well as data uniquely identifying the IoT device 1300.

The credentials management module 1210 then securely transmits a credentials management request to the credentials management module 1215 on the cloud service 1220, which uses the data uniquely identifying the user, the IoT device 1300, and/or the WiFi access point/router 1200 to perform a lookup in the credentials database 1230. Once again, any of the key-based security techniques may be used to ensure the connection between the IoT hub and cloud service is secure. If credentials are located based on the data provided in the request, the credentials management module 1215 securely transmits the network credentials back to the credentials management module 1210 on the IoT hub 1202, which then provides the network credentials to the network registration module 1310 of the IoT device 1300. The IoT device 1300 then uses the network credentials to automatically establish a secure connection to the WiFi access point/router 1200. The end result is that the user is not required to manually configure the new IoT device 1300 to connect with the WiFi access point/router 1200. Rather, because the network credentials have already been associated with the user's account on the cloud service 1220 they may be automatically provided to the IoT device 1300 which will then seamlessly connect to the network.

As mentioned above, while FIG. 13 illustrates the IoT device 1300 connecting through an IoT hub 1202, the IoT device 1300 may connect through another IoT device if the lot hub 1202 is not within range. The other IoT device (which is connected to the IoT hub) may then couple the new IoT device to the credentials management module 1210 on the IoT hub 1202. Similarly, if both the IoT hub and another IoT are unavailable (e.g., out of range), the IoT device 1300 may be configured to connect with the user's mobile device 135, which may include a browser/app to connect with the credentials management module 1215 on the cloud service (either directly or through the IoT hub 1202).

In one embodiment, the network registration module 1310 on the IoT hub 1300 is configured to search first for an IoT hub 1202, then for another IoT device, and then for a user mobile device. It will then connect to the first one of the above devices to offer a connection. The above connections may be formed using any type of local communication protocol including, but not limited to BTLE.

In one embodiment, the network credentials may be stored locally in a secure storage device accessible by the IoT hub 1202 or contained within the IoT hub 1202 (in addition to or in lieu of storing the network credentials remotely on the cloud service 1220). Consequently, in this embodiment, the network credentials may be provided without the need for a remote query to the cloud service 1220.

The term "cloud service" and "IoT cloud service" may refer to any service on the Internet capable of storing and providing network credentials for IoT devices as described herein (e.g., such as the IoT service and external services referenced above). In one embodiment, the cloud service 1220 is owned and operated by the same entity that provides the IoT hub and IoT devices to the end user. In another embodiment, at least some of the IoT devices may be designed and sold by OEMs which coordinate with the cloud service (e.g., via an agreed-upon business arrangement) to ensure that the techniques described herein may be implemented using the cloud service 1220.

Figure 14:
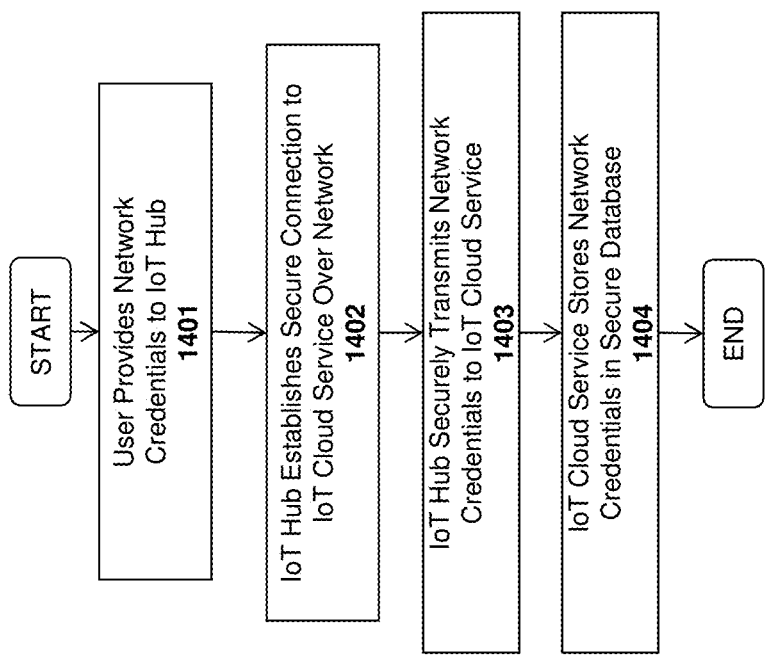
FIG. 14 illustrates one embodiment of a method for collecting and storing network credentials.

A method for collecting and storing network credentials in accordance with one embodiment of the invention is illustrated in FIG. 14. The method may be implemented within the context of the system architectures described above, but is not limited to any particular architecture.

At 1401, the user provides network credentials to the IoT hub. The credentials may be provided, for example, through a network setup wizard executed within a browser or app installed on the user's data processing device, which may connect to the IoT hub through a wired or local wireless connection (e.g., BTLE). Once the network credentials are provided, at 1402 the IoT hub establishes a secure connection to the IoT cloud service over the Internet and, at 1403, securely transmits the network credentials to the IoT cloud service. At 1404, the IoT Cloud Service stores the network credentials in its database, associating the credentials with the user's account on the IoT cloud service and/or with the particular WiFi access point/router for which the network credentials are being used.

Figure 15:
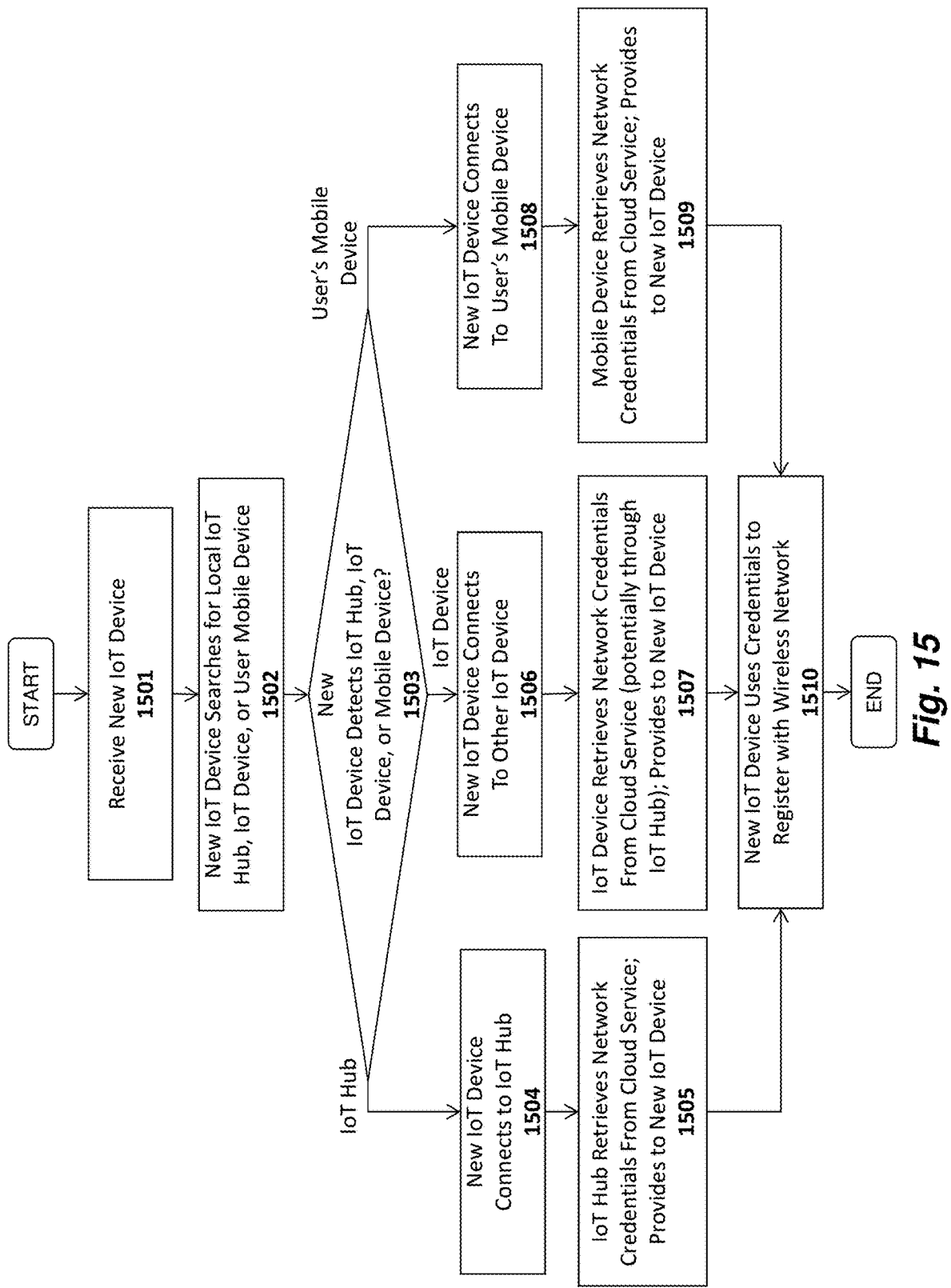
FIG. 15 illustrates one embodiment of a method for registering a new device using stored credentials.

FIG. 15 illustrates a method in accordance with one embodiment of the invention for seamlessly updating a new IoT device using stored network credentials. The method may be implemented within the context of the system architectures described above, but is not limited to any particular architecture.

At 1501, the user receives a new IoT device. The IoT device may have been ordered from the IoT cloud service and/or from an OEM who has a relationship with the IoT cloud service. In either case, the new IoT device is associated with the an account of the user who received the new IoT device.

At 1502, when the new IoT device is powered on, it initially searches for a local IoT hub. As mentioned, the search may be performed using a local wireless protocol such as BTLE. If it cannot locate an IoT hub (e.g., because it is out of range), it may then search for another IoT device and/or a mobile device of the end user (with an app or browser installed thereon to enable a connection to the IoT cloud service).

At 1503 a determination is made as to whether the new IoT device has detected the presence of an IoT hub, another IoT device, or the user's mobile device. If an IoT hub is detected, then at 1504, the new IoT device connects to the IoT hub and, at 1505, the IoT hub retrieves the network credentials from the cloud service on behalf of the new IoT device and provides the credentials to the new IoT device. At 1510, the new IoT device uses the network credentials to register with the wireless network.

If the new IoT device detected another IoT device, then at 1506 it connects to the other IoT device and, at 1507, the IoT device retrieves the network credentials from the IoT cloud service and provides them to the new IoT device. In one embodiment, this may be accomplished through the IoT hub (i.e., if the other device is connected to the IoT hub). Once again, at 1510, the new IoT device uses the network credentials to register with the wireless network.

If the new IoT device detects the user's mobile device, then at 1508, it connects to the mobile device. In one embodiment, the connection is managed by an app such as a connection wizard or browser-executable code on the user's mobile device. At 1509, the IoT device retrieves the network credentials from the IoT cloud service and provides them to the new IoT device. In one embodiment, this may be accomplished through the IoT hub (i.e., if the other device is connected to the IoT hub). At 1510, the new IoT device uses the network credentials to register with the wireless network.

As mentioned, in one embodiment, the network registration module 1310 executed on the new mobile device utilizes a connection priority scheme to determine the order of devices that it should search for when powered on. In one embodiment, it will initially search for an IoT hub and, if one cannot be found, will search for other IoT devices. If none or available, it will then attempt to connect to the user's mobile device. Alternatively, the new IoT device may simply connect to the first device it locates and/or may connect to the device for which it sees the highest signal strength (i.e., RSSI value). Various other connection techniques may be programmed into the network registration module 1310 while still complying with the underlying principles of the invention.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:

maintaining secure connectivity between an Internet of Things (IoT) cloud service and a plurality of IoT devices and IoT apps installed on mobile devices of end users;

establishing a first secure communication channel between the IoT cloud service and a first IoT device of a first user or an IoT app installed on a mobile device of the first user;

securely transmitting from the first IoT device or the IoT app installed on the mobile device to the IoT cloud service a first WiFi network key associated with a WiFi network of the first user;

establishing a second secure communication channel between a second IoT device and the IoT cloud service through the IoT app installed on the mobile device or through the first IoT device, the second secure communication channel including a first WiFi communication link between the second IoT device and the first IoT device or the mobile device and a second WiFi communication link between the first IoT device or the mobile device and the WiFi network of the first user, the second IoT device to establish the second secure communication channel with the IoT cloud service using both the first communication link and the second communication link; and transmitting a request for the first WiFi network key usable on the WiFi network of the first user, the IoT cloud service to associate the second IoT device with an account of the first user and to transmit the first WiFi network key to the second IoT device through the IoT app installed on the mobile device of the first user or through the first IoT device, the first WiFi network key to be passed across the first communication link and the second communication link; and using the first WiFi network key to establish a secure connection by the second IoT device on the WiFi network of the first user.

2. The method as in claim 1, further comprising:

securely storing WiFi network keys for WiFi networks of different users, including the first WiFi network key, in a secure database maintained on the IoT cloud service receiving the WiFi network keys from the IoT devices, IoT apps installed on users' mobile devices, or IoT hubs, the IoT cloud service securely storing the WiFi network keys in the secure database.

3. The method as in claim 2, wherein the IoT cloud service is to receive the request for the IoT network keys from an IoT hub, of the first user, the first IoT device, and/or the IoT app installed on the first user's mobile device and to responsively perform a lookup in the secure database using an identity of the first user, the identity of the second IoT device, and/or the identity of an access point or router associated with the first WiFi network key, the IoT cloud service further to provide the first WiFi network key to the IoT hub of the first user, the first IoT device, and/or the IoT app on the first user's mobile device, the IoT hub of the first user, the first IoT device, and/or the IoT app on the first user's mobile device to provide the first WiFi network key to the second IoT device.

4. The method as in claim 2, further comprising:

establishing a secure connection between a credentials management module on the IoT hub of the first user and a credentials management module on the IoT cloud service; and providing the first WiFi network key to the IoT cloud service via the secure connection.

5. The method as in claim 4, further comprising:

establishing a connection between a network registration module on the second IoT device and the credentials management module on the IoT hub of the first user to send the request for the first WiFi network key and to receive the first WiFi network key from the IoT hub of the first user.

6. The method as in claim 4 further comprising:

attempting to connect with the IoT hub of the first user, the first IoT device, and the IoT app installed on the mobile device of the first user in a prioritized order.

7. The method as in claim 6, wherein the prioritized order comprises first attempting to connect with the IoT hub of the first user and, if a reliable connection is unavailable, then attempting to connect with the first IoT device and/or the IoT app installed on the mobile device of the first user.

8. The method as in claim 1, wherein the request for the first WiFi network key comprises identification data uniquely identifying a wireless access point or router.

9. The method as in claim 8, wherein the identification data comprises a MAC address and/or SSID of the wireless access point or router.

10. A system comprising:

an Internet of Things (IoT) cloud service to maintain secure connectivity with a plurality of IoT devices and IoT apps installed on mobile devices of end users;

a first IoT device of a first user or an IoT app installed on a mobile device of the first user to establish a first secure communication channel with the IoT cloud service and to securely transmit to the IoT cloud service a first WiFi network key associated with a WiFi network of the first user;

a second IoT device to establish a second secure communication channel with the IoT cloud service through the IoT app installed on the mobile device or through the first IoT device, the second secure communication channel including a first WiFi communication link between the second IoT device and the first IoT device or the mobile device and a second WiFi communication link between the first IoT device or the mobile device and the WiFi network of the first user, the second IoT device to establish the second secure communication channel with the IoT cloud service using both the first communication link and the second communication link; and the second IoT device to transmit a request for the first WiFi network key usable on the WiFi network of the first user, the IoT cloud service to associate the second IoT device with an account of the first user and to transmit the first WiFi network key to the second IoT device through the IoT app installed on the mobile device of the first user or through the first IoT device, the first WiFi network key to be passed across the first communication link and the second communication link; and the second IoT device to automatically use the first WiFi network key to establish a secure connection on the WiFi network of the first user.

11. The system as in claim 10 further comprising:

a secure database maintained on the IoT cloud service to securely store WiFi network keys for WiFi networks of different users, including the first WiFi network key, the IoT cloud service to receive the WiFi network keys from the IoT devices, IoT apps installed on users' mobile devices, or IoT hubs, the IoT cloud service to securely store the WiFi network keys in the secure database.

12. The system as in claim 11 wherein the IoT cloud service is configured to receive the request for the first WiFi network key from an IoT hub of the first user, the first IoT device, and/or the IoT app installed on the first user's mobile device and to responsively perform a lookup in the secure database using an identity of the first user, the identity of the second IoT device, and/or the identity of an access point or router associated with the first WiFi network key, the IoT cloud service to provide the first WiFi network key to the IoT hub of the first user, the first IoT device, and/or the IoT app on the first user's mobile device, the IoT hub of the first user, the first IoT device, and/or the IoT app on the first user's mobile device to provide the first WiFi network key to the second IoT device.

13. The system as in claim 11 further comprising:
a credentials management module on the IoT hub of the first user to establish a secure connection to a credentials management module on the IoT cloud service to provide the first WiFi network key to the IoT cloud service.

14. The system as in claim 13 further comprising:
a network registration module on the second IoT device to connect with the credentials management module on the IoT hub of the first user to send the request for the first WiFi network key and to receive the first WiFi network key from the IoT hub of the first user.

15. The system as in claim 13 further comprising:
a network registration module on the second IoT device to attempt to connect with the IoT hub of the first user, the first IoT device, and the IoT app installed on the mobile device of the first user in a prioritized order.

16. The system as in claim 15 wherein the prioritized order comprises first attempting to connect with the IoT hub of the first user and, if a reliable connection is unavailable, then attempting to connect with the first IoT device and/or the IoT app installed on the mobile device of the first user.

17. The system as in claim 11 wherein the second secure communication channel utilizes at least a portion of the first secure communication channel.

18. The system as in claim 10 wherein the request for the first WiFi network key comprises identification data uniquely identifying a wireless access point or router.

19. The system as in claim 18 wherein the identification data comprises a MAC address and/or SSID of the wireless access point or router.

20. A non-transitory machine-readable medium having program code stored thereon which, when executed by one or more machines, cause the machines to perform operations of:
maintaining secure connectivity between an Internet of Things (IoT) cloud service and a plurality of IoT devices and IoT apps installed on mobile devices of end users;
establishing a first secure communication channel between the IoT cloud service and a first IoT device of a first user or an IoT app installed on a mobile device of the first user;
securely transmitting from the first IoT device or the IoT app installed on the mobile device to the IoT cloud service a first WiFi network key associated with a WiFi network of the first user;
establishing a second secure communication channel between a second IoT device and the IoT cloud service through the IoT app installed on the mobile device or through the first IoT device, the second secure communication channel including a first communication link between the second IoT device and the first IoT device or the mobile device and a second WiFi communication link with between the first IoT device or the mobile device and the WiFi network of the first user, the second IoT device to establish the second secure communication channel with the IoT cloud service using both the first communication link and the second communication link; and
transmitting a request for the first WiFi network key usable on the WiFi network of the first user, the IoT cloud service to associate the second IoT device with an account of the first user and to transmit the first WiFi network key to the second IoT device through the IoT app installed on the mobile device of the first user or through the first IoT device, the first WiFi network key to be passed across the first communication link and the second communication link; and
using the first WiFi network key to establish a secure connection by the second IoT device on the WiFi network of the first user.

21. The non-transitory machine-readable medium as in claim 20, wherein the operations further comprise:
securely storing WiFi network keys for WiFi networks of different users, including the first WiFi network key, in a secure database maintained on the IoT cloud service receiving the WiFi network keys from the IoT devices, IoT apps installed on users' mobile devices, or IoT hubs, the IoT cloud service securely storing the WiFi network keys in the secure database.

22. The non-transitory machine-readable medium as in claim 21, wherein the IoT cloud service is to receive the request for the IoT network keys from an IoT hub, of the first user, the first IoT device, and/or the IoT app installed on the first user's mobile device and to responsively perform a lookup in the secure database using an identity of the first user, the identity of the second IoT device, and/or the identity of an access point or router associated with the first WiFi network key, the IoT cloud service providing the first WiFi network key to the IoT hub of the first user, the first IoT device, and/or the IoT app on the first user's mobile device, the IoT hub of the first user, the first IoT device, and/or the IoT app on the first user's mobile device to provide the first WiFi network key to the second IoT device.

23. The non-transitory machine-readable medium as in claim 21, wherein the operations further comprise:
establishing a secure connection between a credentials management module on the IoT hub of the first user and a credentials management module on the IoT cloud service; and
providing the first WiFi network key to the IoT cloud service via the secure connection.

24. The non-transitory machine-readable medium as in claim 23, wherein operations further comprise:
establishing a connection between a network registration module on the second IoT device and the credentials management module on the IoT hub of the first user to send the request for the first WiFi network key and to receive the first WiFi network key from the IoT hub of the first user.

25. The non-transitory machine-readable medium as in claim 23, wherein the operations further comprise:
attempting to connect with to connect with the IoT hub of the first user, the first IoT device, and the IoT app installed on the mobile device of the first user in a prioritized order.

26. The non-transitory machine-readable medium as in claim 25, wherein the prioritized order comprises first attempting to connect with the IoT hub of the first user and, if a reliable connection is unavailable, then attempting to connect with the first IoT device and/or the IoT app installed on the mobile device of the first user.

27. The non-transitory machine-readable medium as in claim 20, wherein the request for the first WiFi network key comprises identification data uniquely identifying a wireless access point or router.

28. The non-transitory machine-readable medium as in claim 27, wherein the identification data comprises a MAC address and/or SSID of the wireless access point or router.

* * * * *